US008325112B2

(12) United States Patent
Park et al.

(10) Patent No.: US 8,325,112 B2
(45) Date of Patent: Dec. 4, 2012

(54) ORGANIC LIGHT EMITTING DISPLAY AND METHOD OF DRIVING THEREOF

(75) Inventors: Kyong-Tae Park, Suwon-si (KR); Baek-Woon Lee, Yongin-si (KR); Alexander Arkhipov, Suwon-si (KR)

(73) Assignee: Samsung Display Co., Ltd. (KR)

( * ) Notice: Subject to any disclaimer, the term of this patent is extended or adjusted under 35 U.S.C. 154(b) by 1055 days.

(21) Appl. No.: 12/260,943

(22) Filed: Oct. 29, 2008

(65) Prior Publication Data

US 2009/0115707 A1 May 7, 2009

(30) Foreign Application Priority Data

Nov. 6, 2007 (KR) ........................ 10-2007-0112530

(51) Int. Cl.
*G09G 3/30* (2006.01)
*G09G 5/00* (2006.01)
*G06F 3/038* (2006.01)

(52) U.S. Cl. ............................. 345/76; 345/98; 345/204

(58) Field of Classification Search .................... 345/76, 345/204

See application file for complete search history.

(56) References Cited

U.S. PATENT DOCUMENTS

| | | | | |
|---|---|---|---|---|
| 8,194,012 | B2 * | 6/2012 | Choi | 345/77 |
| 2004/0090434 | A1 * | 5/2004 | Miyazawa | 345/204 |
| 2005/0140600 | A1 * | 6/2005 | Kim et al. | 345/76 |
| 2005/0200575 | A1 * | 9/2005 | Kim et al. | 345/76 |
| 2006/0028408 | A1 * | 2/2006 | Kim | 345/76 |
| 2006/0066532 | A1 * | 3/2006 | Jeong | 345/76 |
| 2006/0077138 | A1 * | 4/2006 | Kim | 345/76 |
| 2006/0108937 | A1 * | 5/2006 | Kim | 315/169.3 |
| 2007/0024541 | A1 * | 2/2007 | Ryu et al. | 345/76 |
| 2007/0040772 | A1 * | 2/2007 | Kim | 345/76 |
| 2007/0120780 | A1 * | 5/2007 | Park et al. | 345/76 |
| 2008/0007546 | A1 * | 1/2008 | Kawabe | 345/211 |
| 2008/0111804 | A1 * | 5/2008 | Choi et al. | 345/205 |
| 2008/0122759 | A1 * | 5/2008 | Levey | 345/78 |
| 2008/0158114 | A1 * | 7/2008 | Kim | 345/77 |
| 2009/0073092 | A1 * | 3/2009 | Numao | 345/76 |

* cited by examiner

*Primary Examiner* — Amare Mengistu
*Assistant Examiner* — Sarvesh J Nadkarni
(74) *Attorney, Agent, or Firm* — Innovation Counsel LLP

(57) ABSTRACT

An organic light-emitting display device and a method of driving the display device are disclosed. A pixel circuit used in the organic light-emitting display device includes a first switching transistor, a second switching transistor and a driving transistor. The first switching transistor switches a data voltage in response to a first control signal. The second switching transistor switches a compensation voltage in response to a second control signal. The driving transistor provides an electric current to an organic light-emitting device in response to the data voltage and the compensation voltage.

11 Claims, 7 Drawing Sheets

ORGANIC LIGHT EMITTING DISPLAY AND METHOD OF DRIVING THEREOF

CROSS-REFERENCE TO RELATED APPLICATIONS

This application claims priority under 35 U.S.C. §119 to Korean Patent Application No. 10-2007-0112530, filed on Nov. 6, 2007 in the Korean Intellectual Property Office (KIPO), the contents of which are herein incorporated by reference in their entirety.

BACKGROUND OF THE INVENTION

1. Field of the Invention

The present invention relates to an organic light-emitting display device and a method of driving the organic light-emitting display device. More particularly, the present invention relates to an active matrix organic light-emitting display device and a method of driving the organic light-emitting display device.

2. Description of the Related Art

Mobile communication needs have developed as life style changes have recently occurred, so that it is desirable that multimedia devices have a display device with lighter-weight, lower power consumption and slimmer shape than before. An organic light-emitting display device, which is one of the new display devices satisfying the above need, is a self-emitting type, so that display characteristics, such as a viewing angle, a contrast ratio and so on, are excellent compared to a liquid crystal display device. In addition, the organic light-emitting display device can be formed in a slim shape and consumes less power because a backlight is not required.

There are a passive matrix type and an active matrix type in the technology of organic light-emitting display devices. A positive electrode and a negative electrode are formed to cross each other and lines are selected for driving in the passive matrix type. On the other hand, in the active matrix, a driving voltage switched by a switching transistor is sustained with a capacitor and is applied to a driving transistor, so that an electric current in an organic light-emitting device is controlled.

However, characteristics of a threshold voltage of the driving transistor are different according to positions of the organic light-emitting display panel in a conventional organic light-emitting display device with the active matrix type. Such differences of the threshold voltage are caused by a process error in a manufacturing process of a thin film transistor (TFT). Even if an equivalent driving voltage is applied to the driving transistor of each of the pixels, the differences in the threshold voltage cause differences of electric current in the organic light-emitting device, so that each pixel displays different luminance as a consequence.

When a deviation of the threshold voltage of the driving transistor is generated in the organic light-emitting display panel, a defect in uniformity of luminance occurs, and spots display on the screen. The deviation of the threshold voltage of the driving transistor is different according to the organic light-emitting display panel, so that a black level and a white level are different according to the panel. Thus, panel characteristics such as brightness and contrast ratio are not constant for each of the organic light-emitting display panels.

SUMMARY OF THE INVENTION

The present invention provides an organic light-emitting display device to compensate for a difference in a threshold voltage of a driving transistor by a compensation voltage.

The present invention also provides a method of driving the organic light-emitting display device.

In one aspect of the present invention, a pixel circuit includes a first switching transistor, a second switching transistor and a driving transistor. The first switching transistor switches a data voltage in response to a first control signal. The second switching transistor switches a compensation voltage in response to a second control signal. The driving transistor provides an electric current to an organic light-emitting device in response to the data voltage and the compensation voltage.

The first and the second switching transistors are electrically connected to a data line, the data line transferring the data voltage and the compensation voltage.

The driving transistor includes a control terminal, an input terminal and an output terminal. The control terminal receives the data voltage and the compensation voltage from the first and the second switching transistors, and the input terminal receives a driving voltage, and the output terminal is electrically connected to the organic light-emitting device.

The pixel circuit may further include a first capacitor and a second capacitor. The first capacitor is electrically connected to the control terminal and the input terminal of the driving transistor, and the second capacitor is electrically connected to the control terminal of the driving transistor and the second transistor.

The pixel circuit may further include a third switching transistor. The third switching transistor switches a reference voltage to the second capacitor in response to the first control signal.

The first switching transistor provides the data voltage to the control terminal of the driving transistor when the first control signal is activated, and the second switching transistor provides the compensation voltage to the second capacitor when the second control signal is activated, and activation sections of the first control signal and the second control signal are not overlapped.

The first switching transistor is electrically connected to a data line transferring the data voltage, and the second switching transistor is electrically connected to a compensation line transferring the compensation voltage.

The driving transistor includes a control terminal, an input terminal and an output terminal. The control terminal receives the data voltage and the compensation voltage from the first and the second switching transistors. The input terminal receives a driving voltage, and the output terminal is electrically connected to the organic light-emitting device.

The pixel circuit may further include a first capacitor and a second capacitor. The first capacitor is electrically connected to the control terminal and the input terminal of the driving transistor, and the second capacitor is electrically connected to the control terminal of the driving transistor and the second transistor.

The pixel circuit may further include a third switching transistor providing a reference voltage to the second capacitor in response to the second control signal, and the second control signal is an (N+1)-th scan signal when the first control signal is an N-th scan signal.

The first switching transistor provides the data voltage to the driving transistor when only the first control signal is activated, and the second switching transistor provides a clear voltage to the second capacitor when the first control signal and the second control signal are simultaneously activated, and the second switching transistor provides the compensation voltage to the second capacitor when only the second control signal is activated.

In one embodiment, an organic light-emitting display device includes a display panel, a data driving part, a first scan driving part and a second scan driving part. The display panel includes a plurality of pixels electrically connected to a plurality of data lines and a plurality of first and second scan lines. The data driving part provides a data voltage and a compensation voltage to the data line. The first scan driving part provides a first scan signal to the first scan line, the first scan signal being activated to transfer the data voltage. The second scan driving part provides a second scan signal to the second scan line, the second scan signal being activated to transfer the compensation voltage. Each of the pixels includes a first switching transistor, a second switching transistor and a driving transistor. The first switching transistor switches the data voltage in response to the first scan signal, and the second switching transistor switches the compensation voltage in response to the second scan signal, and the driving transistor provides an electrical current to an organic light-emitting device in response to the data voltage and the compensation voltage.

The first switching transistor provides the data voltage to a control terminal of the driving transistor when the first control signal is activated, and the second switching transistor provides the compensation voltage to the control terminal of the driving transistor when the second control signal is activated, and activation sections of the first control signal and the second control signal are not overlapped.

In another embodiment, an organic light-emitting display device includes a display panel, a data driving part and a scan driving part. The display panel includes a plurality of pixels electrically connected to a plurality of data lines, a plurality of compensation lines and a plurality of scan lines. The data driving part provides a data voltage to the data line and provides a compensation voltage to the compensation line, and the scan driving part provides a first scan signal to the first scan line and provides a second scan signal to the second scan line, the first scan signal being activated to transfer the data voltage and the second scan signal being activated to transfer the compensation voltage. Each of the pixels includes a first switching transistor, a second switching transistor and a driving transistor. The first switching transistor switches the data voltage in response to the first scan signal, and the second switching transistor switches the compensation voltage in response to the second scan signal, and the driving transistor provides an electrical current to an organic light-emitting device in response to the data voltage and the compensation voltage.

The second scan signal is an (N+1)-th scan signal when the first control signal is an N-th scan signal.

In another embodiment, an organic light-emitting display device includes a display panel, a data driving part, a scan driving part. The display panel includes a plurality of pixels electrically connected to a plurality of data lines, a plurality of compensation lines and a plurality of first and second scan lines. The data driving part provides a data voltage to the data line and provides a compensation voltage to the compensation line. The scan driving part provides a first scan signal to the first scan line and provides a second scan signal to the second scan line, the first scan signal being activated to transfer the data voltage and the second scan signal being activated to transfer the compensation voltage. Each of the pixels includes a first switching transistor, a second switching transistor and a driving transistor. The first switching transistor switches the data voltage in response to the first scan signal, and the second switching transistor switches the compensation voltage in response to the second scan signal, and the driving transistor provides an electrical current to an organic light-emitting device in response to the data voltage and the compensation voltage.

The first switching transistor provides the data voltage to the driving transistor when only the first control signal is activated, and the second switching transistor provides a clear voltage to the second capacitor when the first control signal and the second control signal are simultaneously activated, and the second switching transistor provides the compensation voltage to the second capacitor when only the second control signal is activated.

In another aspect of the present invention, a data voltage to a control terminal of a driving transistor is provided in a method of driving an organic light-emitting display device. The driving transistor provides an electric current to an organic light-emitting device during a first timing section. And then, a compensation voltage is provided to a control terminal of the driving transistor during a second timing section. The compensation voltage compensates a threshold voltage of the driving transistor.

The data voltage is accumulated to a first capacitor in response to a first control signal and provided to a control terminal of the driving transistor in the step of providing the data voltage. In the step of providing the compensation voltage, the compensation voltage is provided to a control terminal of the driving transistor through a second capacitor in response to a second control signal.

The method may further include the step of providing a reference voltage through the second capacitor to the control terminal of the driving transistor between the step of providing the data voltage and the step of providing the compensation voltage.

According to the present invention, the organic light-emitting display device and the method of driving the organic light-emitting display device have a compensation process, in which the deviation of the threshold voltage of the driving transistor is compensated by a compensation voltage applied separately. The compensation voltage is alloted in the conventional data voltage area, so that brightness is preserved, as well as non-uniformity of brightness caused by the deviation of the threshold voltage of each of the driving transistors is improved.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

Figure 1:
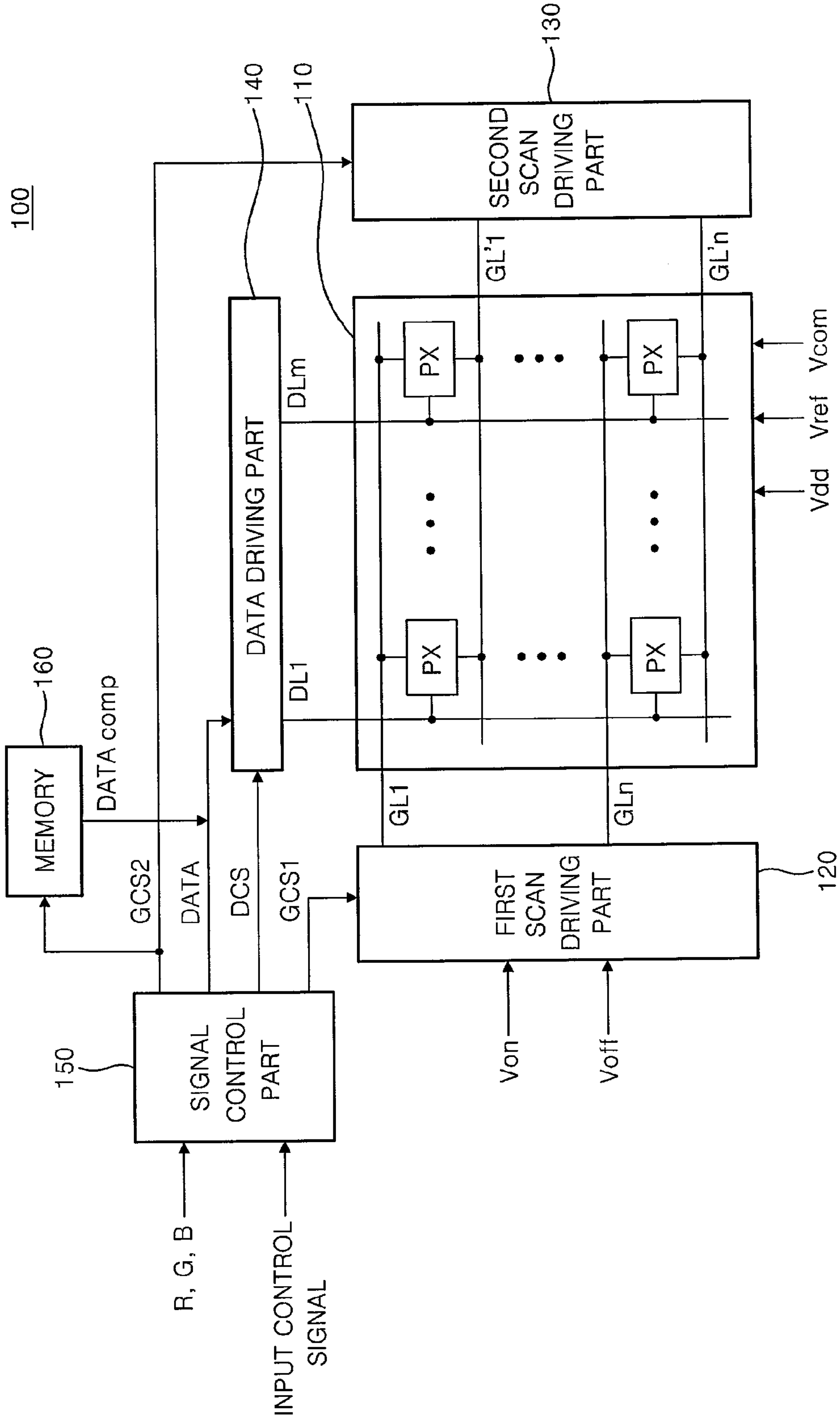
FIG. 1 is a block diagram of an organic light-emitting display device in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough, and will convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

FIG. 1 is a block diagram of an organic light-emitting display device in accordance with an embodiment of the present invention. Referring to FIG. 1, an organic light-emitting display device 100 in accordance with an embodiment of the present invention includes a display panel 110, first and second scan driving parts 120 and 130, a data driving part 140, a signal control part 150 and a memory 160.

The display panel 110 includes a plurality of data lines DL1 to DLm, a plurality of first and second scan lines GL1 to GLn and GL'1 to GL'n, a plurality of driving voltage lines (not shown), a plurality of reference voltage lines (not shown) and a plurality of pixels PX. Each of the pixels is electrically connected to each of the data lines, the first and second scan lines, the voltage lines and the reference voltage lines, and each of the pixels is formed as a matrix shape.

Each of the data lines DL1 to DLm transfers a data voltage Vdata and a compensation voltage Vcomp, and is extended in a column direction, and is substantially parallel to each other. The data voltage Vdata corresponds to a display data DATA, and the compensation voltage Vcomp corresponds to a compensation data DATAcomp. The compensation voltage Vcomp compensates a deviation of a threshold voltage of a driving transistor (not shown) of each of the plurality of pixels PX.

The first and second scan lines GL1 to GLn and GL'1 to GLn transfer scan signals to the pixels PX, and are extended in a row direction. The first and second scan lines GL1 to GLn and GL'1 to GL'n are separated from each other, and substantially parallel to each other. The driving voltage lines transfer driving voltages Vdd to the pixels PX, and the reference voltage lines transfer a reference voltage Vref to the pixels PX.

The first and second scan driving parts 120 and 130 are electrically connected to first and second scan lines GL1 to GLn and GL'1 to GLn, respectively. The first and second scan driving parts 120 and 130 provide first and second scan signal to the first and second scan lines GL1 to GLn and GL'1 to GLn in response to first and second scan control signals GCS1 and GCS2, respectively.

The first and second scan signals include a turn-on voltage Von and a turn-off voltage Voff. The turn-on voltage Von turns on switching transistors (not shown) of each of the pixels PX, and the turn-off voltage Voff turns off the switching transistors of each of the pixels PX. Moreover, the data voltage Vdata is provided to each of the pixels PX when the first scan signal is activated, and the compensation voltage Vcomp is provided to each of the pixels PX when the second scan signal is activated.

The data driving part 140 is electrically connected to the data lines DL1 to DLm. The data driving part 140 selects a data voltage Vdata corresponding to the display data DATA and a compensation voltage Vcomp corresponding to the compensation data DATAcomp, and provides the data voltage Vdata and the compensation voltage Vcomp to the data lines DL1 to DLm.

The memory 160 stores the compensation data DATAcomp in a look up table (LUT) form in one example. The memory 160 may provide the compensation data DATAcomp to the data driving part 140 based on the second scan control signal GCS2 of the signal control part 150.

The signal control part 150 receives an input control signal from an external graphic controller (not shown), and generates first and second scan control signals GCS1 and GCS2, data control signal DCS and so on, based on the input control signal. The signal control part 150 transfers the first and second scan control signals GCS1 and GCS2 and the data control signal DCS to the first and second scan driving parts 120 and 130 and the data driving part 140, respectively.

The input control signal includes a vertical synchronizing signal Vsync, a horizontal synchronizing signal Hsync, a main clock Mclk and a data enable signal DE. Each of the first and second scan control signals GCS1 and GCS2 includes a scan start signal, a scan clock and an output enable signal. The data control signal DCS includes a data start signal, a data clock and a data load signal. The first scan control signal GCS1 controls the first scan driving part 120 during a first timing section, and the second scan control signal GCS2 controls the second scan driving part 130 during a second timing section. A sum of the first timing section and the second timing section consists of one horizontal period or one frame period.

Moreover, the signal control part 150 receives the input data R, G and B from the external graphic controller (not shown), and processes the input data R, G and B according to an operational condition of the display panel 110 to generate the display data DATA. The signal control part 150 provides the display DATA to the data driving part 140 during the first timing section. The signal control part 150 reads out the compensation data DATAcomp with reference to a lookup table saved in the memory 160, and provides the compensation data DATAcomp to the data driving part 140 during the second timing section.

A more detailed description concerning a method of generating a compensation data DATAcomp may be found below. The compensation data DATAcomp is stored in the memory 160 as a lookup table in one example, and is provided to each of the pixels PX. The method of generating the compensation data in accordance with the present embodiment may include generating a luminance map, generating a threshold voltage map and generating a lookup table.

In the step of generating the luminance map, a driving voltage corresponding to a constant gray-scale, which may be 100 gray scale, for example, is applied to all of the pixels, and a light-emitting luminance of a front face of the display panel 110 is determined using an inspection device such as a camera and so on, and the filmed light-emitting luminance is generated as the luminance map of the display panel 110. The threshold voltage of the driving transistor of each of the pixels of the display panel 110 may have different values because of a process error of the TFT. Thus, the luminance having deviations caused by the deviation of the threshold voltage is stored in the luminance map.

In the step of generating the threshold voltage map, threshold voltages of all of the driving transistors of the display panel 110 are calculated and the threshold voltage map Vth Map is generated. The threshold voltage may be calculated by using a relation between a threshold voltage of the driving transistor and a luminance of a pixel when a constant driving voltage is applied to all of the driving transistors of the display panel 110. An optimum relation between the threshold voltage of the driving transistor and the luminance of the pixel may be decided experimentally.

In the step of generating the lookup table, the threshold voltage of the threshold voltage map is changed as a compensation data DATAcomp corresponding to a gray-scale level, and the compensation data DATAcomp is stored to the memory 160 of the organic light-emitting display device 100. For example, when the display data DATA is 1024 gray-scale and a data voltage Vdata corresponding to the display data DATA is 16 V, the compensation data DATAcomp corresponding to the threshold voltage may be calculated using a proportional relation between the display data DATA and the data voltage Vdata.

Figure 2:
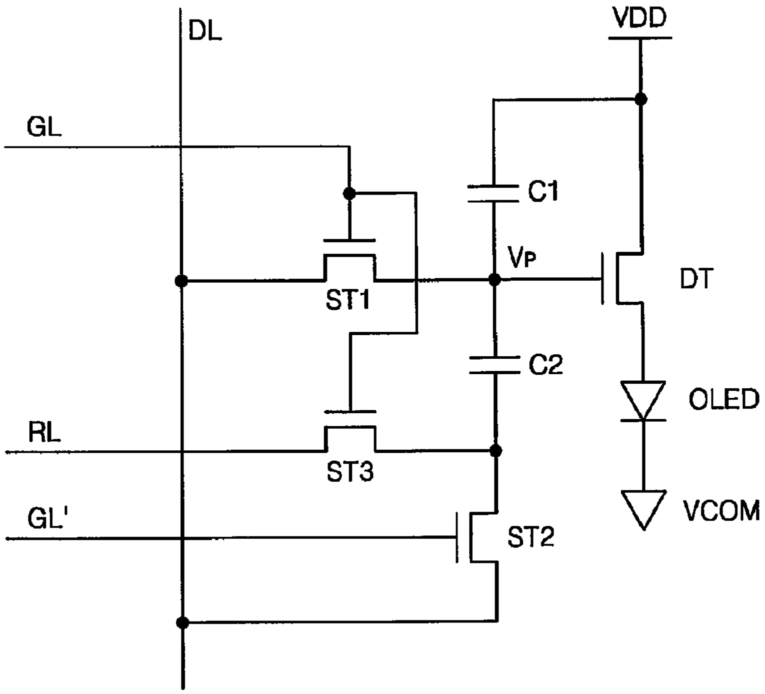
FIG. 2 is an exemplary equivalent circuit corresponding to a pixel of the display panel illustrated in FIG. 1.

FIG. 2 is an exemplary equivalent circuit corresponding to a pixel of the display panel illustrated in FIG. 1. Referring to FIG. 2, one of the pixels of the display panel includes a driving transistor DT, an organic light-emitting device OLED, a first capacitor C1, a second capacitor C2, a first switching transistor ST1, a second switching transistor ST2 and a third switching transistor ST3.

An input terminal of the driving transistor DT is electrically connected to a driving voltage Vdd, and an output terminal of the driving transistor DT is electrically connected to an anode electrode of the organic light-emitting device, and a control terminal of the driving transistor DT is electrically connected to an output terminal of the first switching transistor ST1. The driving transistor DT provides a driving electric current to the organic light-emitting device OLED in response to a data voltage Vdata provided to a control terminal through the first switching transistor ST1.

The organic light-emitting device OLED may be a light-emitting diode having a light-emitting layer. The anode electrode of the organic light-emitting device OLED is electrically connected to the output terminal of the driving transistor DT, and a cathode electrode of the organic light-emitting device OLED is electrically connected to a common voltage Vcom. The organic light-emitting device OLED receives the driving electric current from the driving transistor DT and emits light.

The first capacitor C1 is electrically connected to the control terminal and the input terminal of the driving transistor DT. The data voltage Vdata and the driving voltage Vdd are transferred to the first capacitor C1 through the first switching transistor ST1. The first capacitor C1 is electrically charged according to a voltage difference between the data voltage Vdata and the driving voltage Vdd.

The second capacitor C2 is electrically connected to the control terminal of the driving transistor DT and an output terminal of the second switching transistor ST2. The compensation voltage Vcomp is provided through the second switching transistor ST2, and a voltage of the control terminal of the driving transistor DT is raised by a coupling.

An input terminal of the first switching transistor ST1 is electrically connected to a data line DL, and an output terminal of the first switching transistor ST1 is electrically connected to the control terminal of the driving transistor DT, and the control terminal of the switching transistor ST1 is electrically connected to a first scan line GL.

An input terminal of the second switching transistor ST2 is electrically connected to the data line DL, and an output terminal of the second switching transistor ST2 is electrically connected to the second capacitor C2, and a control terminal of the second switching transistor ST2 is electrically connected to a second scan line GL'. A second scan signal is provided to the second switching transistor ST2 through the second scan line GL. The second switching transistor ST2 provides the compensation voltage Vcomp to the second capacitor C2 in response to the second scan signal.

An input terminal of the third switching transistor ST3 is electrically connected to a reference voltage line RL, and an output terminal of the third switching transistor ST3 is electrically connected to the output terminal of the second switching transistor ST2, and a control terminal of the third switching transistor ST3 is electrically connected to the first scan line GL. A first scan signal is provided to the third switching transistor ST3 through the first scan line. The third switching transistor ST3 provides a reference voltage Vref to the second capacitor C2 in response to the first scan signal.

The driving transistor DT and the first, the second and the third switching transistors ST1, ST2 and ST3 include an n-channel metal oxide semiconductor field effect transistor (NMOSFET) having a poly silicon or an amorphous silicon. The driving transistor DT and the first, the second and the third switching transistors ST1, ST2 and ST3 may include a p-channel MOSFET (PMOSFET). Because the p-channel MOSFET and n-channel MOSFET complement each other, an operation, a voltage and an electric current of the p-channel MOSFET is opposite to the n-channel MOSFET.

Figure 3:
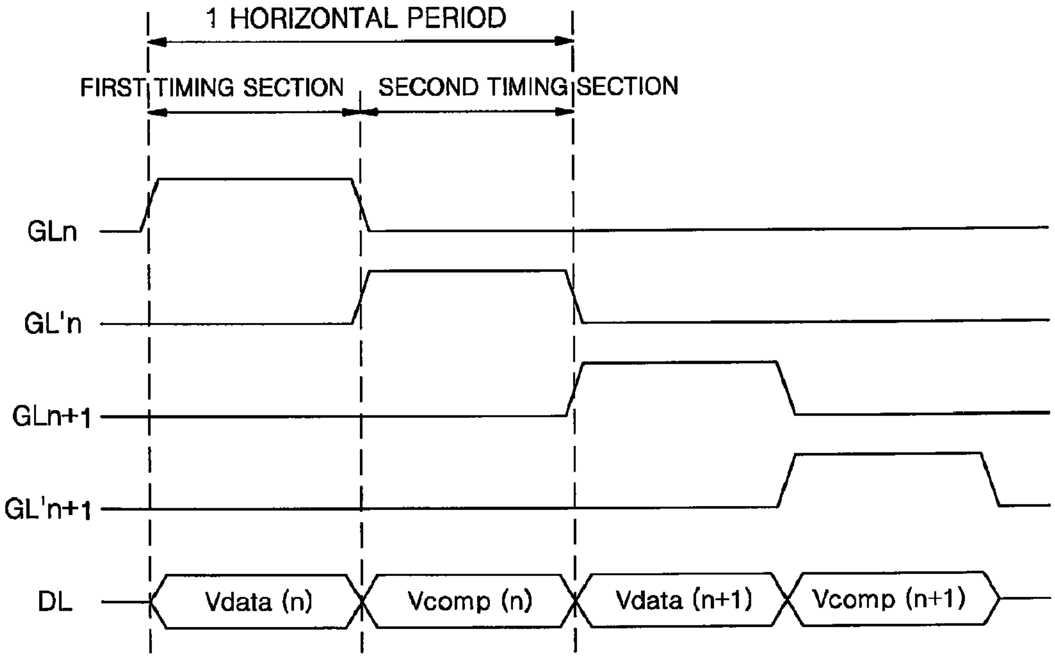
FIG. 3 is a driving timing diagram showing an operation of the equivalent circuit illustrated in FIG. 2.

FIG. 3 is a driving timing diagram showing an operation of the equivalent circuit illustrated in FIG. 2. Referring to FIGS. 2 and 3, one horizontal period 1H includes a first timing section and a second timing section. The first scan signal is activated during the first timing section, and the second scan signal is activated during the second timing section.

In particular, the first scan signal is a turn-on level during the first timing section, and the second scan signal is a turn-off level during the second scan signal. The first and third switching transistors ST1 and ST3 are turned on, and the second switching transistor ST2 is turned off.

When the switching transistor ST1 is turned on, the data voltage Vdata is provided to the control terminal of the driving transistor DT, and the first capacitor C1 is charged according to a voltage difference between the driving voltage Vdd and the data voltage Vdata. When the third switching transistor ST3 is turned on, the reference voltage Vref is provided to the second capacitor C2, and the second capacitor C2 is charged according to a voltage difference between the data voltage Vdata and the reference voltage Vref. The reference voltage Vref may be a ground potential voltage, and the reference voltage Vref, for example, may be zero volt.

The first scan signal is the turn-off level and the second scan signal is the turn-on level during the second timing section. Thus, the first and third switching transistors ST1 and ST3 are turned off and the second switching transistor ST2 is turned on.

When the switching transistor ST2 is turned on and the third switching transistor ST3 is turned off, a voltage provided to the second capacitor C2 is changed from a level of the reference voltage Vref to a level of the compensation voltage Vcomp. Thus, a voltage of the control terminal of the driving transistor DT is changed. The first capacitor C1 and the second capacitor C2 are coupled according to a voltage change provided to the second capacitor C2, so that the voltage of the control terminal of the driving transistor DT is changed. An amount of the voltage change ΔV is obtained by the following Equation 1.

$$\Delta V = \frac{C_2}{C_1 + C_2}(V_{comp} - V_{ref})$$ < Equation 1 >

A voltage Vp is provided by the control terminal of the driving transistor DT during one horizontal period. The voltage Vp is obtained by the following Equation 2.

$$V_p = V_{data} + \Delta V = V_{data} + \frac{C_2}{C_1 + C_2}(V_{comp} - V_{ref})$$ < Equation 2 >

When the data voltage Vdata and the compensation voltage Vcomp are provided to the pixel circuit in accordance with an embodiment of the present invention, the deviation of the threshold voltage of the driving transistor DT may be compensated. A compensation process will be described by the following Equations 3 to 6.

$I_{ds}=K(V_{gs}-V_{th})^2=K(V_p-V_{oled}-V_{th})^2$ (a saturation condition) < Equation 3 >

An electric current Ids of Equation 3 is a drain source current of the driving transistor DT. The driving transistor DT operates in the saturation condition, and the electric current Ids of Equation 3 is provided to the organic light-emitting device OLED. The electric current Ids may be defined with a voltage Vgs and a threshold voltage Vth. The voltage Vgs is an electric voltage between a gate as the control terminal of the driving transistor DT and a source as the input terminal of the driving transistor DT The voltage Vth is a threshold voltage of the driving transistor DT. K is a parameter depending on a size, a mobility, a capacitance and so on of the driving transistor DT.

The voltage Vgs is an electric voltage between the gate and the source of the driving transistor DT, and the voltage Vgs may be defined as a voltage difference between an electric voltage applied to the control terminal of the driving transistor DT and an electric voltage of the organic light-emitting device OLED.

The applied voltage Vp of Equation 2 is applied to Equation 3, so that the following Equation 4 is obtained.

$$\begin{aligned} I_{ds} &= K\left\{V_{data} + \frac{C_2}{C_1 + C_2}(V_{comp} - V_{ref}) - V_{oled} - V_{th}\right\}^2 \\ &= K\left\{V_{data} - V_{oled} - \left(\frac{C_2}{C_1 + C_2}V_{comp} - V_{th}\right)\right\}^2 \\ &\doteq K(V_{data} - I_{ds}R_{oled})^2 \end{aligned}$$ < Equation 4 >

In Equation 4, an electric voltage difference caused by the compensation voltage Vcomp (i.e.

$$\frac{C_2}{C_1 + C_2} V_{comp} \Big)$$

approaches to the threshold voltage Vth, so that a difference between the voltage caused by the compensation Vcomp and the threshold voltage Vth is certainly decreased. Thus, the difference between the voltage caused by the compensation Vcomp and the threshold voltage Vth (i.e.

$$\left( \frac{C_2}{C_1 + C_2} V_{comp} - V_{th} \right) \Big)$$

approaches zero.

Thus, the electric current Ids is obtained by using Equation 4, and the following Equation 5 is obtained.

$$I_{ds} = \frac{2KR_{oled}V_p + 1 - \sqrt{1 + 4KR_{oled}V_p}}{2KR_{oled}} \quad \text{< Equation 5 >}$$

Referring to Equation 5, when the data voltage Vdata and the compensation voltage Vcomp are provided to the pixel circuit in accordance with an embodiment of the present invention, the threshold voltage Vth of the driving transistor may be compensated. Thus, the electric current of the driving transistor DT does not depend on the threshold voltage of the driving transistor DT.

The threshold voltage Vth of the driving transistor DT is generated by a manufacturing process of the organic light-emitting display panel 110. The threshold voltage Vth of the driving transistor DT does not have influence on the deviation of the electric current Ids. Thus, uniformity of the luminance of the organic light-emitting display panel 110 may be improved.

Moreover, the uniformity for the luminance may be improved by the data voltage Vdata and the independent compensation voltage Vcomp. The data voltage is not sacrificed for compensating the threshold voltage. Thus, the luminance is not reduced while the uniformity of the luminance is improved in accordance with the embodiment of the present invention.

Figure 4:
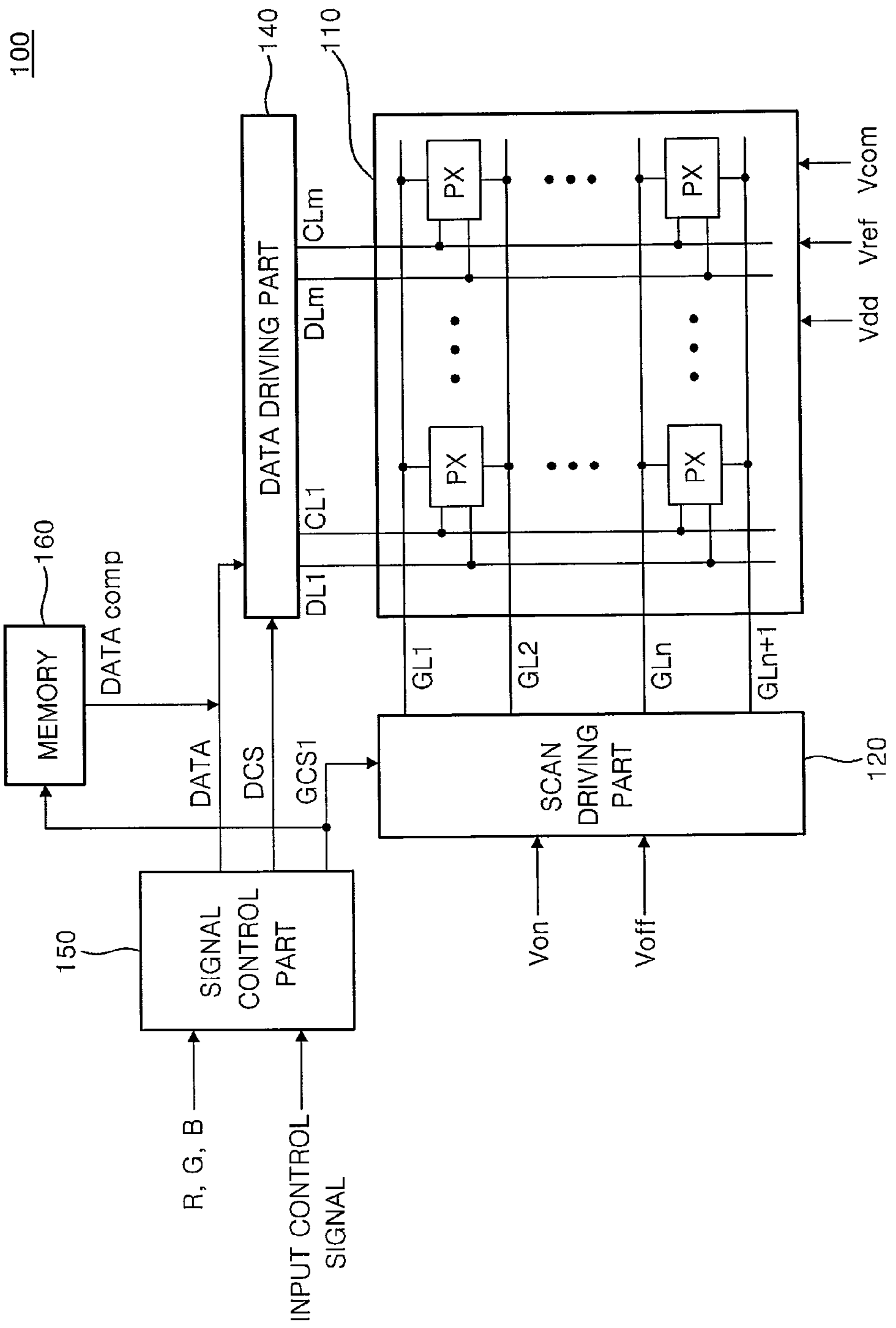
FIG. 4 is a block diagram of an organic light-emitting display device in accordance with another embodiment of the present invention.

FIG. 4 is a block diagram of an organic light-emitting display device in accordance with another embodiment of the present invention. Referring to FIG. 4, an organic light-emitting display apparatus 100 in accordance with another embodiment of the present invention, includes a display panel 110, a scan driving part 120, a data driving part 140, a signal control part 150 and a memory 160.

The display panel 110 includes data lines DL1 to DLm and compensation lines CL1 to CLm. The data lines DL1 to DLm provide data voltage Vdata to pixels PX, and the compensation lines CL1 to CLm provide compensation voltage Vcomp to the pixels PX. The display panel 110 of the organic light-emitting display apparatus in accordance with another embodiment of the present invention, includes the compensation lines CL1 to CLm formed separately from the data lines DL1 to DLm. Each of the pixels PX is electrically connected to N-th scan line GLn and (N+1)-th scan line GLn+1.

The scan driving part 120 is electrically connected to the scan line GL1 to GLn, and provides a scan signal to scan lines GL1 to GLn in response to the scan signal. The scan signal includes a combination of a turn-on voltage and a turn-off voltage. The scan signal provided to the N-th scan line GLn is activated to provide the data voltage Vdata to the pixels PX electrically connected to the N-th scan line GLn. The scan signal provided to the (N+1)-th scan line GLn+1 is activated to provide the compensation voltage Vcom to the pixels PX electrically connected to the N-th scan line GLn as well as to provide the data voltage Vdata to the pixels PX electrically connected to the (N+1)-th scan line GLn+1.

The data driving part 140 is electrically connected to the data lines DL1 to DLm and the compensation lines CL1 to CLm. The data driving part 140 selects the data voltage Vdata corresponding to a display data DATA and provides the data voltage Vdata corresponding to the display data DATA to the data lines DL1 to DLm during a first timing section in response to a data control signal DCS. The data driving part 140 selects the compensation voltage Vcomp corresponding to a compensation data DATAcomp and provides the compensation voltage Vcomp corresponding to the compensation data DATAcomp to the compensation lines CL1 to CLm during a second timing section in response to the data control signal DCS. The first timing section is defined as a time to provide a scan signal of a turn-on level to the N-th scan line GLn, and the second timing section is defined as a time to provide the scan signal of the turn-on level to the (N+1)-th scan line GLn+1.

The signal control part 150 receives an input control signal from an external graphic controller (not shown), and generates a scan control signal GCS, the data control signal DCS and so on based on the input control signal, and provides the scan control signal GCS and the data control signal DCS to the scan driving part 120 and the data driving part 140, respectively.

Moreover, the signal control part 150 receives an input data R, G and B from the external graphic controller, and processes the input data R, G and B to be suitable to an operation condition of the display panel 110, and generates the display data DATA. The signal control part 150 provides the display data DATA to the data driving part 140 during the first timing section. The signal control part 150 reads out the compensation data DATAcomp with reference to a look-up table stored in the memory 160, and provides the compensation data DATAcomp to the data driving part 140 during the second timing section.

The detail description will be omitted because the other component and the other operation are well known to any person skilled in the art to which it pertains.

Figure 5:
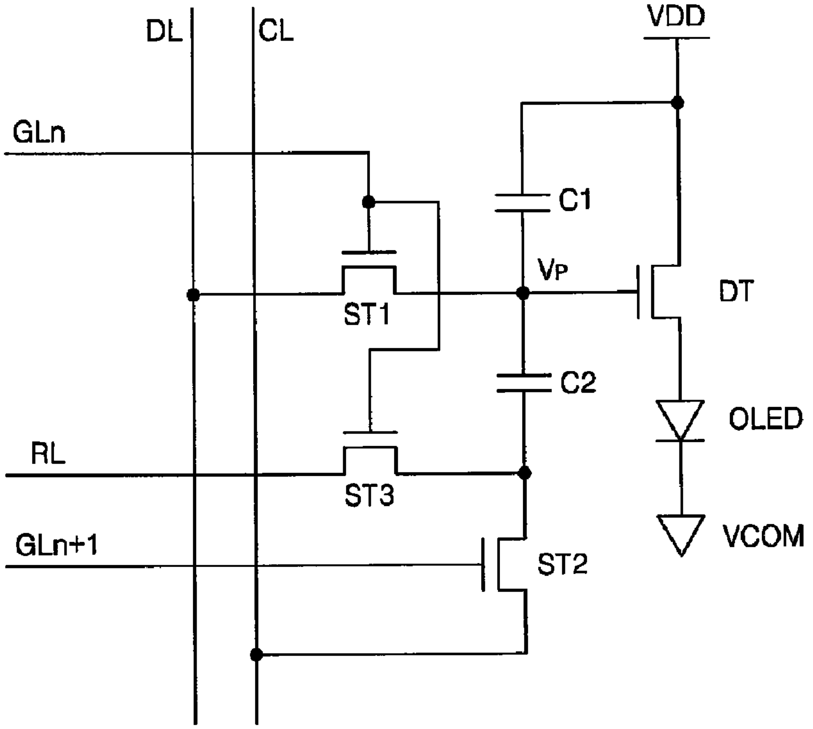
FIG. 5 is an exemplary equivalent circuit corresponding to a pixel of the display panel illustrated in FIG. 4.

FIG. 5 is an exemplary equivalent circuit corresponding to a pixel of the display panel illustrated in FIG. 4. Referring to FIG. 4, a pixel of the display panel includes a driving transistor DT, an organic light-emitting device OLED, a first capacitor C1, a second capacitor C2, a first switching transistor ST1, a second switching transistor ST2 and a third switching transistor ST3.

An input terminal of the first switching transistor ST1 is electrically connected to the data line DL, and an output terminal of the first switching transistor ST1 is electrically connected to a control terminal of the driving transistor DT, a control terminal of the first switching transistor ST1 is electrically connected to the N-th scan line GLn. The first switching transistor ST1 provides the data voltage Vdata to the control terminal of the driving transistor DT in response to a scan signal provided through the N-th scan line GLn.

An input terminal of the second switching transistor ST2 is electrically connected to the compensation line CL, and an output terminal of the second switching transistor ST2 is electrically connected to the second capacitor C2, and a control terminal of the second switching transistor ST2 is electrically connected to the (N+1)-th scan line GLn+1. The second switching transistor ST2 provides the compensation voltage Vcomp to the second capacitor in response to a scan signal provided through the (N+1)-th scan line GLn+1.

The detail description of the driving transistor DT, the organic light-emitting device OLED, the first capacitor C1, the second capacitor C2 and the third switching transistor ST3 will be omitted because those are well known to any person skilled in the art to which it pertains.

A pixel circuit of an organic light-emitting display apparatus in accordance with another embodiment of the present invention, is electrically connected to a separated data line DL and a compensation line CL, and receives a data voltage Vdata from the data line DL. The pixel circuit receives a compensation voltage Vcomp from the compensation line CL to include a mean for compensating a deviation of a threshold voltage of the driving transistor DT.

The pixel circuit of an organic light-emitting display apparatus in accordance with another embodiment of the present invention, has a structure in which the compensation line CL transferring the compensation voltage Vcomp is formed separately from the data line DL, so that a charging time of the pixel circuit is substantially twice as long compared with the pixel circuit in FIG. 2.

Figure 6:
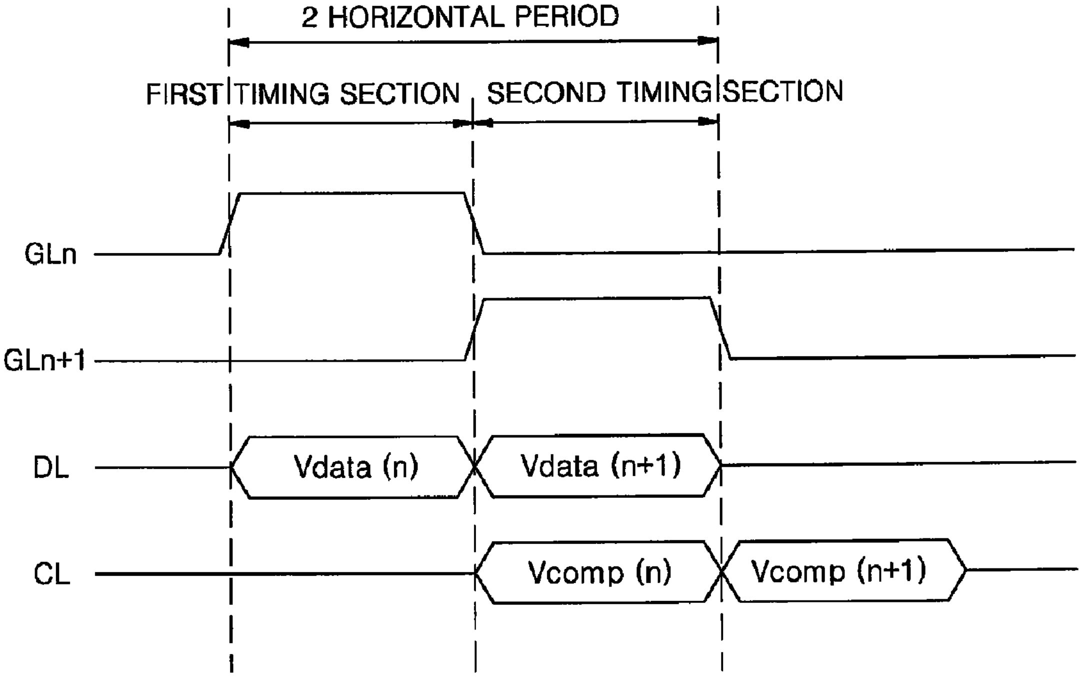
FIG. 6 is a driving timing diagram showing an operation of the equivalent circuit illustrated in FIG. 5.

FIG. 6 is a driving timing diagram showing an operation of the equivalent circuit illustrated in FIG. 5. Referring to FIGS. 5 and 6, the pixel circuit in FIG. 5 operates based on the N-th and (N+1)-th scan signals. The pixel circuit in FIG. 5 operates by two horizontal period 2H. The two horizontal period 2H is a total time of a first timing section and a second timing section. The N-th scan signal is activated during the first timing section, and the (N+1)-th scan signal is activated during the second timing section.

The N-th scan signal has a turn-on level Von, and the (N+1)-th scan signal has a turn-off level Voff during the first timing section. Thus, the first and third switching transistors ST1 and ST3 are turned on, and the second switching transistor ST2 is turned off during the first timing section. The data voltage Vdata is applied to the control terminal of the driving transistor DT, and a reference voltage Vref is applied to the second capacitor C2, so that the first and the second capacitors C1 and C2 are electrically charged according to a voltage difference between the driving voltage and the reference voltage.

The N-th scan signal includes a turn-off level and the (N+1)-th scan signal includes a turn-on level during the second timing section. The first and the third switching transistor ST1 and ST3 are turned off, and the second switching transistor ST2 is turned on. The compensation voltage Vcomp is provided to the second capacitor C2, and so that a voltage applied to the control terminal of the driving transistor FT is raised by a coupling.

When data voltage Vdata and the compensation voltage Vcomp are provided to the pixel circuit in accordance with another embodiment of the present invention, the threshold voltage of the driving transistor DT may be compensated. The detail description of the compensation of the threshold voltage will be omitted because those are well known to any person skilled in the art to which it pertains.

Figure 7:
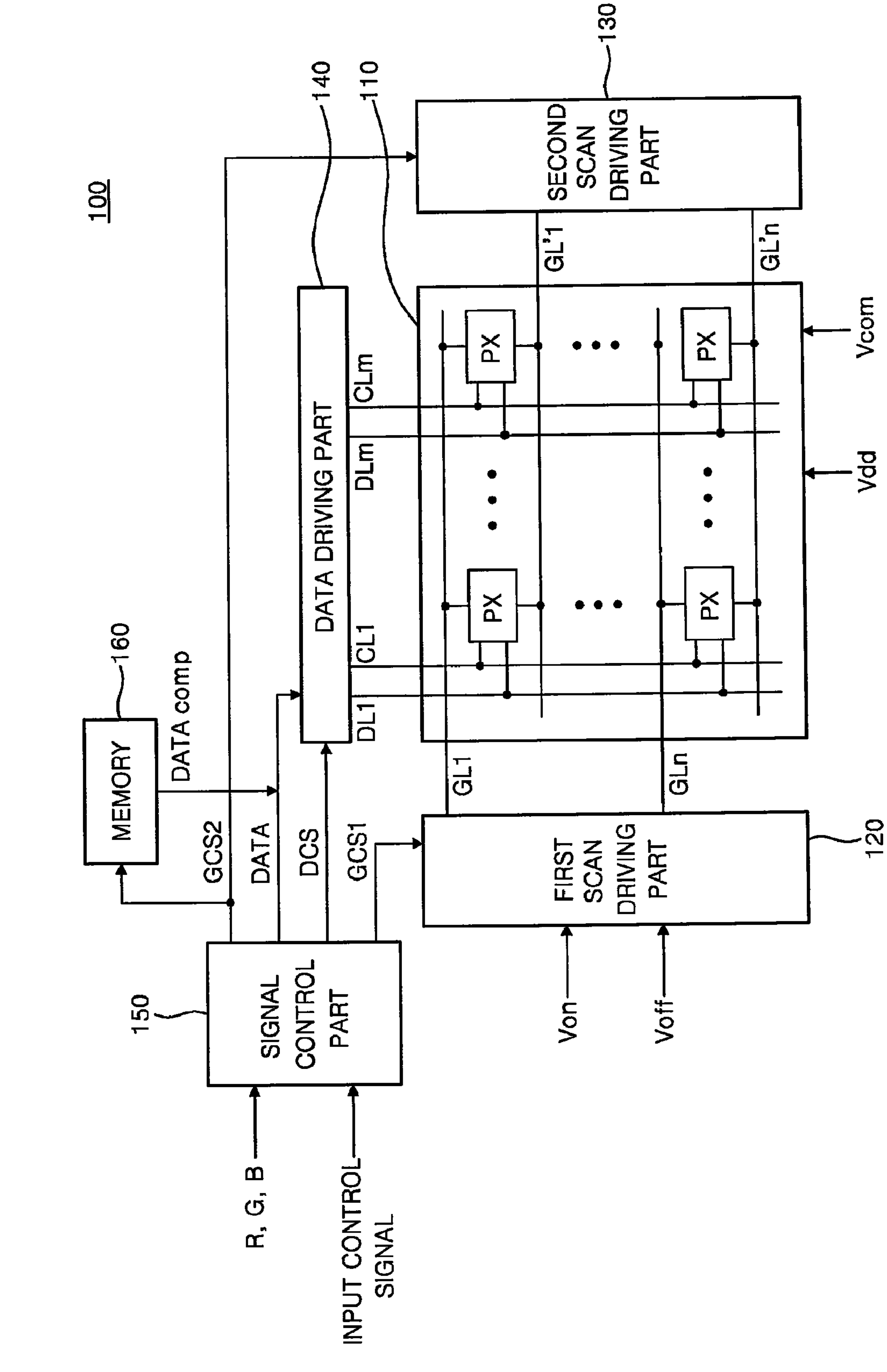
FIG. 7 is a block diagram of an organic light-emitting display device in accordance with another embodiment of the present invention.

FIG. 7 is a block diagram of an organic light-emitting display device in accordance with another embodiment of the present invention. Referring to FIG. 7, the organic light-emitting display device in accordance with the another embodiment of the present invention includes a display panel 110, first and second scan driving parts 120 and 130 and a data driving part 140.

The display panel 110 includes data lines DL1 to DLm, compensation lines CL1 to CLm, first scan lines GL1 to GLn and second scan lines GL'1 to GL'n. The data lines transfer data voltages Vdata to pixels PX, and the compensation lines transfer compensation voltage Vcomp to the pixels PX, and the first scan lines GL1 to GLn transfer first scan signals, and the second scan lines GL'1 to GL'n transfer second scan signals. The first scan signals are for transferring the data voltages Vdata to the pixels PX, and the second scan signals are for transferring the compensation voltages Vcomp to the pixels PX.

The display panel 110 of the organic light-emitting device 100 includes compensation lines CL1 to CLm, the first scan lines GL1 to GLn and the second scan lines GL'1 to GL'n. The compensation lines CL1 to CLm are formed separately from the data lines DL1 to DLm. The first scan lines GL1 to GLn and the second scan lines GL'1 to GL'n are for transferring the first and second scan signals, respectively. The organic light-emitting display apparatus 100, which is different from the organic light-emitting display device in FIGS. 1 and 4, does not include a reference voltage line in the display panel 110, and a reference voltage is not applied.

The first and second scan driving part 120 and 130 are electrically connected to the first and second scan lines GL1 to GLn and GL'1 to GL'n, respectively. The first and second scan driving parts 120 and 130 provide the first and second scan signals, which are formed as combinations of a turn-on voltage Von and a turn-off voltage Voff, to the first and second scan lines GL1 to GLn and GL'1 to GL'n, respectively. The first scan signal is a signal for providing a data voltage Vdata to a pixel, and the second scan signal is a signal for providing a compensation voltage Vcomp and a clear voltage Vclear to the pixel.

The data driving part 140 is electrically connected to the data lines DL1 to DLm and the compensation lines CL1 to CLm, and selects the data voltage Vdata corresponding to a display data DATA in response to the data control signal DCS, and selects a compensation voltage Vcomp corresponding to the compensation data DATAcomp and a clear voltage Vclear to initiate a capacitor of a pixel circuit to the data lines DL1 to DLm.

The signal controller 150 receives an input control signal from an external graphic controller (not shown), and generates first and second scan control signals GCS1 and GCS2, a data control signal DCS and so on, and provides the first and second scan control signals GCS1 and GCS2, the data control signal DCS and so on to the data driving part 140.

Moreover, the signal controller 150 receives an input data R, G and B from the external graphic controller (not shown), and process according to an operation condition of the display panel 110, and generates the display data DATA, and provides the display data DATA to the data driving part 140.

The signal controller 150 reads out the compensation data DATAcomp with reference to a look-up table stored in the memory 160, and provides the compensation data DATAcomp and a clear data DATAclear to the data driving part 140. The clear data DATAclear may be stored in the memory 160, in which the look-up table is stored, or another memory. The clear data DATAclear is a substitute for the reference voltage Vref in FIGS. 1 and 4. The clear data, for example, may be a gray-scale data corresponding to a zero volt.

Figure 8:
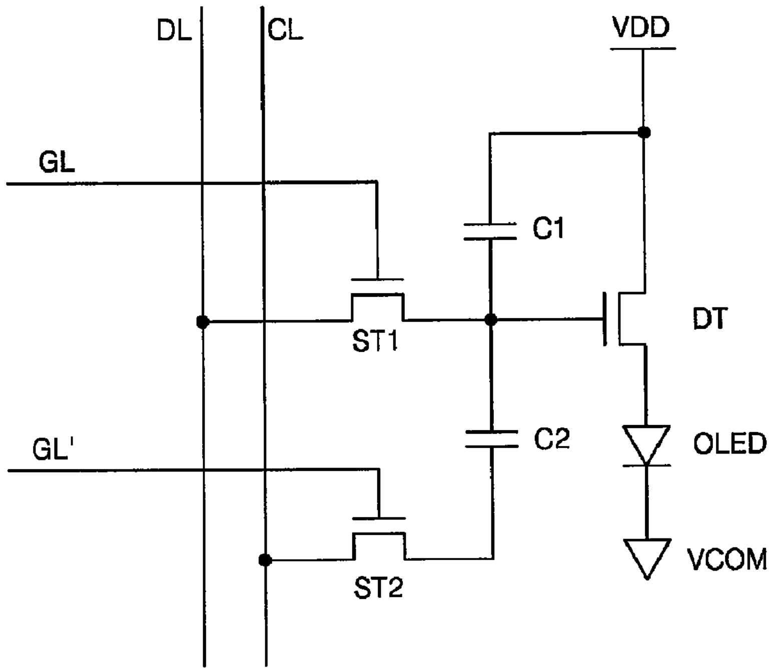
FIG. 8 is an exemplary equivalent circuit corresponding to a pixel of the display panel illustrated in FIG. 7.

FIG. 8 is an exemplary equivalent circuit corresponding to a pixel of the display panel illustrated in FIG. 7. Referring to FIG. 8, one pixel of the display panel 110 includes a driving transistor DT, an organic light-emitting device OLED, a first capacitor C1, a second capacitor C2, a first switching transistor ST1 and a second switching transistor ST2.

An input terminal of the first switching transistor ST1 is electrically connected to a data line DL, and an output terminal of the first switching transistor ST1 is electrically connected to a control terminal of the driving transistor DT, and a control terminal of the first switching transistor ST1 is electrically connected to a first scan line GL. The first switching transistor ST1 provides the data voltage Vdata to the driving transistor DT in response to a first scan signal transferred through the first scan line GL.

An input terminal of the second switching transistor ST2 is electrically connected to the compensation line CL, and an output terminal of the second switching transistor ST2 is electrically connected to the second capacitor C2, and a control terminal of the second switching transistor ST2 is electrically connected to the second scan line GL'. The second switching transistor ST2 provides a compensation voltage Vcomp and a clear voltage Vclear to the second capacitor C2 in response to the second scan signal transferred through the second scan line GL'.

The detail description of the driving transistor DT, the organic light-emitting device, the first capacitor C2 and the second capacitor C2 will be omitted as those are well known to any person skilled in the art to which it pertains.

A pixel circuit of an organic light-emitting display device 100 in accordance another embodiment of the present invention, is electrically connected to a data line DL and a compensation line CL separated from the data line DL, receives a data voltage Vdata from the data line DL, and receives a compensation voltage Vcomp and a clear voltage Vclear from the compensation line CL, and compensates a deviation of a threshold voltage of the driving transistor DT. Thus, the pixel circuit of the organic light-emitting display device 100 does not include a third transistor receiving a reference voltage when compared with the pixel circuit illustrated in FIGS. 2 and 5.

Figure 9:
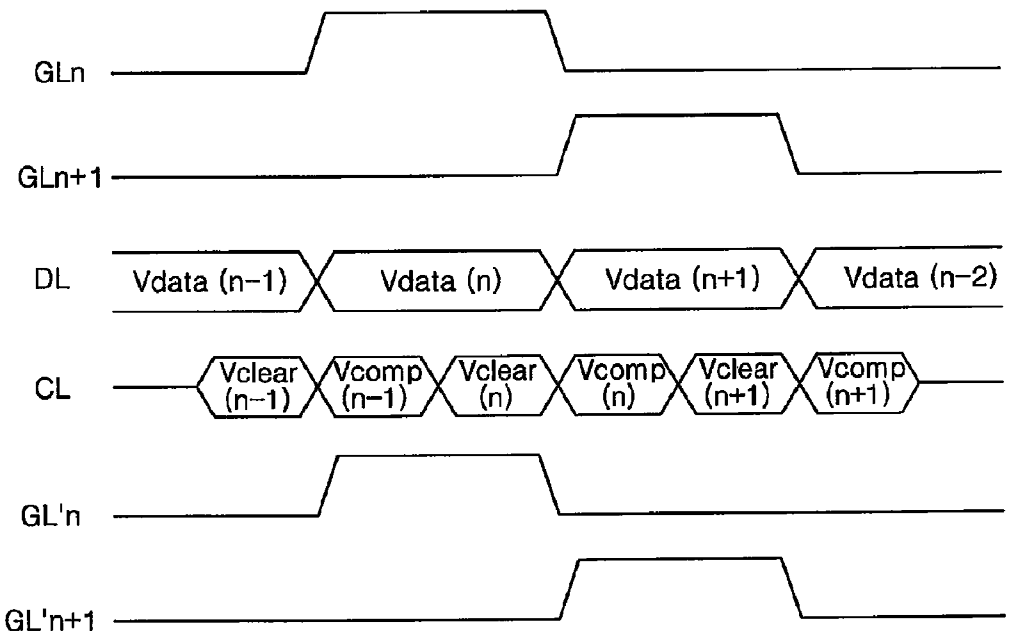
FIG. 9 is a driving timing diagram showing an operation of the equivalent circuit illustrated in FIG. 8.

FIG. 9 is a driving timing diagram showing an operation of the equivalent circuit illustrated in FIG. 8. Referring to FIGS. 8 and 9, the pixel circuit of FIG. 8 operates based on a first scan signal, a second scan signal, a data voltage Vdata, a compensation voltage Vcomp and a clear voltage Vclear.

The first scan signal and the second scan signal simultaneously include a turn-on level and a turn-off level. A total time of providing the clear voltage Vclear and the compensation voltage Vcomp is substantially the same as a providing time of the data voltage Vdata. The first scan signal has the turn-on level when the data voltage Vdata is provided. The data voltage Vdata is provided, and then the clear voltage Vclear overlapping with the data voltage Vdata is provided, and then the compensation voltage Vcomp, which is not overlapped with the data voltage Vdata, is provided.

The first and the second switching transistors ST1 and ST2 are turned on when the first and the second scan signals have the turn-on level. When first switching transistor ST1 is turned on, the data voltage Vdata is provided to the control terminal of the driving transistor DT, and the first capacitor C1 is electrically charged to the same voltage difference as the voltage difference of the driving voltage Vdd and the data voltage Vdata. The second switching transistor ST2 is turned on, the clear voltage Vclear, which is overlapped with the data voltage, is provided. The compensation voltage Vcomp is provided to the second capacitor C2 after the data voltage Vdata is provided. The clear voltage Vclear, which corresponds to the reference voltage in FIG. 2, may be a zero volt.

The second capacitor C2 is electrically charged to the same voltage difference as the voltage difference of the data voltage Vdata and the clear voltage Vclear, and the compensation voltage Vcomp is applied to the second capacitor C2, and the second capacitor C2 changes the voltage of the control terminal of the driving transistor DT. The second capacitor C2 changes the voltage of the control terminal of the driving transistor DT. The first capacitor C1 and the second capacitor C2 are coupled, thereby changing the voltage of the control terminal of the driving transistor DT.

When the data voltage Vdata, the compensation voltage Vcomp and the clear voltage Vclear are provided to the pixel circuit, the threshold voltage of the driving transistor may be compensated. The detail description for the compensation of the threshold voltage of the driving transistor will be omitted because those are well known to any person skilled in the art to which it pertains from the detail description for the driving of the pixel circuit in FIG. 5.

Figure 10:
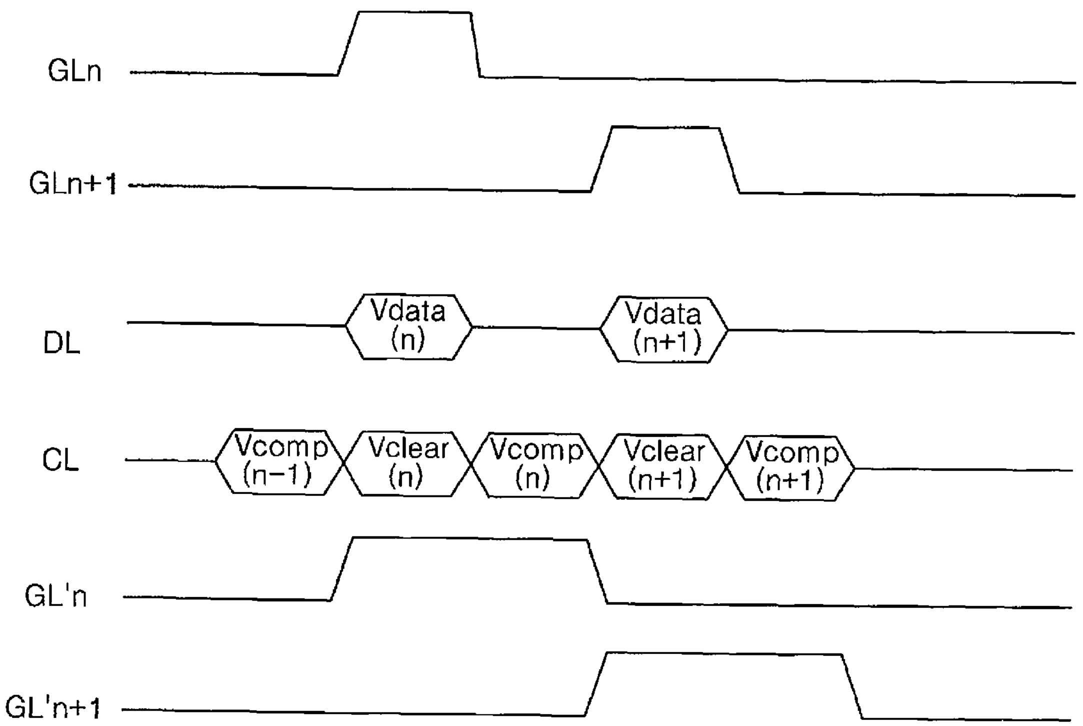
FIG. 10 is another driving timing diagram showing the operation of the equivalent circuit illustrated in FIG. 8.

FIG. 10 is another driving timing diagram showing the operation of the equivalent circuit illustrated in FIG. 8. Referring to FIGS. 8 and 10, the pixel circuit in FIG. 8 operates based on a first scan signal, a second scan signal, a data voltage Vdata, a compensation voltage Vcomp and a clear voltage Vclear.

A turn-on level section of the second scan signal is greater than a turn-on level section of the first scan signal. The data voltage Vdata is provided while the first scan signal has the turn-on level, and the clear voltage Vclear is provided while the second scan signal has the turn-on level. The clear voltage Vclear and the data voltage Vdata may be simultaneously provided, and the compensation voltage, which is not overlapped with the data voltage Vdata may be provided.

When the first and second scan signals have the turn-on level Von, the first and the second switching transistors ST1 and ST2 are turned on. When the first switching transistor ST1 is turned on, the data voltage Vdata is provided to the control terminal of the driving transistor DT, thereby electrically charging the first capacitor C1 to the same voltage difference as the voltage difference of the driving voltage Vdd and the data voltage Vdata. When the second switching transistor ST2 is turned on, the clear voltage, which is overlapped with the data voltage Vdata, is provided to the second capacitor C2, and the compensation voltage Vcomp is provided to the second capacitor after providing the data voltage Vdata.

The second capacitor C2 is electrically charged to the same voltage difference as the voltage difference of the data voltage Vdata and the clear voltage Vclear, and the compensation voltage Vcomp is applied, thereby changing the voltage of the control terminal of the driving transistor DT.

When the data voltage Vdata, the compensation voltage Vcomp and the clear voltage Vclear are provided to the pixel circuit, the threshold voltage of the driving transistor may be compensated. The detail description for the compensation of the threshold voltage of the driving transistor will be omitted because those are well known to any person skilled in the art to which it pertains from the detail description for the driving of the pixel circuit in FIG. 5.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A pixel circuit, comprising:

a first switching transistor switching a data voltage in response to a first control signal;

a second switching transistor switching a compensation voltage in response to a second control signal;

a driving transistor providing an electric current to an organic light-emitting device in response to at least one of the data voltage and the compensation voltage; and a capacitor electrically connected between the second switching transistor and the driving transistor, wherein the first switching transistor provides the data voltage to the driving transistor when the first control signal is activated, the second switching transistor provides a clear voltage to the capacitor when the first control signal and the second control signal are simultaneously activated, and the second switching transistor provides the compensation voltage to the capacitor when only the second control signal is activated.

2. The pixel circuit of claim 1, wherein the first and the second switching transistors are electrically connected to a data line, the data line transferring the data voltage and the compensation voltage.

3. The pixel circuit of claim 2, wherein the driving transistor comprises:

a control terminal receiving the data voltage and the compensation voltage from the first and the second switching transistors;

an input terminal receiving a driving voltage; and an output terminal electrically connected to the organic light-emitting device.

4. The pixel circuit of claim 3, wherein the capacitor is electrically connected to the control terminal of the driving transistor.

5. The pixel circuit of claim 1, wherein the first switching transistor is electrically connected to a data line transferring the data voltage, and the second switching transistor is electrically connected to a compensation line transferring the compensation voltage.

6. The pixel circuit of claim 5, wherein the driving transistor comprises:

a control terminal receiving the data voltage and the compensation voltage from the first and the second switching transistors;

an input terminal receiving a driving voltage; and an output terminal electrically connected to the organic light-emitting device.

7. The pixel circuit of claim 6, further comprising:

a first capacitor electrically connected to the control terminal and the input terminal of the driving transistor; and a second capacitor electrically connected to the control terminal of the driving transistor and the second transistor.

8. An organic light-emitting display device, comprising:

a display panel including a plurality of pixels electrically connected to a plurality of data lines, and a plurality of scan lines, the plurality of pixels including a first pixel, the plurality of scan lines including a first scan line and a second scan line;

a data driving part providing a data voltage and a compensation voltage to the plurality of data lines;

a first scan driving part providing a first scan signal to the first scan line, the first scan signal being configured to activate transfer of the data voltage; and a second scan driving part providing a second scan signal to the second scan line, the second scan signal being configured to activate transfer of the compensation voltage, wherein the first pixel includes:

a first switching transistor switching the data voltage in response to the first scan signal;

a second switching transistor switching the compensation voltage in response to the second scan signal; and a driving transistor providing an electrical current to an organic light-emitting device in response to at least one of the data voltage and the compensation voltage, wherein activation sections of the first scan signal and the second scan signal do not overlap wherein the first switching transistor provides the data voltage to a control terminal of the driving transistor when the first switching transistor is activated, and the second switching transistor provides the compensation voltage to a capacitor that is electrically connected to the control terminal of the driving transistor when the second switching transistor is activated.

9. An organic light-emitting display device, comprising:

a display panel including a plurality of pixels electrically connected to a plurality of data lines, a plurality of compensation lines, and a plurality of scan lines, the plurality of pixels including a first pixel, the plurality of data lines including a first data line, the plurality of compensation lines including a first compensation line, the plurality of scan lines including a first scan line and a second scan line;

a data driving part providing a data voltage to the first data line and providing a compensation voltage to the first compensation line; and a scan driving part providing a first scan signal to the first scan line and providing a second scan signal to the second scan line, the first scan signal being configured to activate transfer of the data voltage, the second scan signal being configured to activate transfer of the compensation voltage, wherein the first pixel includes:

a first switching transistor switching the data voltage in response to the first scan signal;

a second switching transistor switching the compensation voltage in response to the second scan signal;

a driving transistor providing an electrical current to an organic light-emitting device in response to at least one of the data voltage and the compensation voltage; and a capacitor electrically connected between the second switching transistor and the driving transistor, wherein the first switching transistor provides the data voltage to the driving transistor when the first control signal is activated, the second switching transistor provides a clear voltage to the capacitor when the first control signal and the second control signal are simultaneously activated, and the second switching transistor provides the compensation voltage to the capacitor when only the second control signal is activated.

10. The display device of claim 9, wherein the second scan signal is an (N+1)-th scan signal when a first control signal is an N-th scan signal.

11. An organic light-emitting display device, comprising:

a display panel including a plurality of pixels electrically connected to a plurality of data lines, a plurality of compensation lines, and a plurality of scan lines, the plurality of pixels including a first pixel, the plurality of data lines including a first data line, the plurality of compensation lines including a first compensation line, the plurality of scan lines including a first scan line and a second scan line;

a data driving part providing a data voltage to the first data line and providing a compensation voltage to the first compensation line; and a scan driving part providing a first scan signal to the first scan line and providing a second scan signal to the second scan line, the first scan signal being configured to activate transfer of the data voltage, the second scan signal being configured to activate transfer of the compensation voltage, wherein the first pixel includes:

a first switching transistor switching the data voltage in response to the first scan signal;

a second switching transistor switching the compensation voltage in response to the second scan signal;

a driving transistor providing an electrical current to an organic light-emitting device in response to at least one of the data voltage and the compensation voltage; and a capacitor electrically connected between the second switching transistor and the driving transistor, wherein the first switching transistor provides the data voltage to the driving transistor when a first control signal is activated, the second switching transistor provides a clear voltage to the capacitor when the first control signal and a second control signal are simultaneously activated, and the second switching transistor provides the compensation voltage to the second capacitor when only the second control signal is activated.

* * * * *